United States Patent
Ishikura

(10) Patent No.: US 10,638,007 B2
(45) Date of Patent: Apr. 28, 2020

(54) SHEET MEDIUM CONVEYING DEVICE, IMAGE FORMING APPARATUS, AND SHEET MEDIUM CONVEYING METHOD

(71) Applicant: Oki Data Corporation, Tokyo (JP)

(72) Inventor: Hiroki Ishikura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/358,806

(22) Filed: Mar. 20, 2019

(65) Prior Publication Data
US 2019/0306353 A1     Oct. 3, 2019

(30) Foreign Application Priority Data
Mar. 28, 2018  (JP) .................................. 2018-062085

(51) Int. Cl.
*H04N 1/00* (2006.01)
*B65H 23/188* (2006.01)
*H04N 1/028* (2006.01)
*B26D 5/20* (2006.01)

(52) U.S. Cl.
CPC .......... *H04N 1/00602* (2013.01); *B26D 5/20* (2013.01); *B65H 23/1884* (2013.01); *H04N 1/00376* (2013.01); *H04N 1/00649* (2013.01); *H04N 1/0285* (2013.01)

(58) Field of Classification Search
CPC .......... H04N 2201/04731; H04N 2201/04791; H04N 2201/03108; H04N 2201/04713; H04N 2201/04722; H04N 2201/04756; H04N 1/0473; H04N 1/506; G03G 15/01; G03G 15/0131; G03G 15/0189; G03G 15/043; G03G 15/5058; G03G 15/80; G03G 2215/0132; G03G 2215/0161; G03G 15/1685; G03G 2215/00156; G03G 2215/0016; G03G 2215/1623
USPC ................................ 358/474, 509, 484, 539
See application file for complete search history.

(56) References Cited

U.S. PATENT DOCUMENTS

| | | | | |
|---|---|---|---|---|
| 7,446,908 B2* | 11/2008 | Araki | .................... | H04N 1/0057 271/10.11 |
| 8,300,073 B2* | 10/2012 | Inaba | ..................... | B41J 11/009 346/24 |
| 8,755,735 B2* | 6/2014 | Okutsu | ............. | G03G 15/6508 271/291 |
| 9,360,813 B2* | 6/2016 | Okano | ................. | G03G 15/234 |
| 9,454,011 B2* | 9/2016 | Hiraide | .............. | G02B 27/0176 |
| 9,507,307 B2* | 11/2016 | Ishihara | .................. | B65H 7/02 |
| 10,362,182 B2* | 7/2019 | Yumoto | | |
| 2004/0139129 A1* | 7/2004 | Okuyama | ............. | G06F 16/214 |

(Continued)

FOREIGN PATENT DOCUMENTS

JP     2008-238484 A     10/2008

*Primary Examiner* — Negussie Worku
(74) *Attorney, Agent, or Firm* — Rabin & Berdo, P.C.

(57) ABSTRACT

A sheet medium conveying device conveys a sheet medium in which position detection marks are provided at regular intervals in a medium conveying direction in which the sheet medium is conveyed. The sheet medium conveying device includes a controller that controls conveyance of the sheet medium. The controller selects one of a first standby position and a second standby position located downstream of the first standby position in the medium conveying direction, and conveys the sheet medium to the selected standby position and puts the sheet medium on standby.

20 Claims, 8 Drawing Sheets

(56) References Cited

U.S. PATENT DOCUMENTS

| | | | |
|---|---|---|---|
| 2005/0063740 A1* | 3/2005 | Masubuchi | G03G 15/0194 399/299 |
| 2006/0165442 A1* | 7/2006 | Kobayashi | G03G 15/1685 399/301 |
| 2013/0272731 A1* | 10/2013 | Tsuruya | G03G 15/0189 399/39 |
| 2015/0298921 A1* | 10/2015 | Ishikura | B65H 1/04 271/264 |
| 2018/0257893 A1* | 9/2018 | Suzuki | B41J 11/02 |
| 2019/0031461 A1* | 1/2019 | Uchibori | B65H 1/04 |
| 2019/0033768 A1* | 1/2019 | Ishikura | G03G 15/6523 |
| 2019/0064724 A1* | 2/2019 | Ishikura | B65H 23/00 |

\* cited by examiner

SHEET MEDIUM CONVEYING DEVICE, IMAGE FORMING APPARATUS, AND SHEET MEDIUM CONVEYING METHOD

BACKGROUND OF THE INVENTION

1. Field of the Invention

The present invention relates to a sheet medium conveying device, an image forming apparatus, and a sheet medium conveying method.

2. Description of the Related Art

Some conventional sheet media, such as label sheets or tag sheets, have marks, such as black marks or notches, provided at regular intervals in conveying directions in which the sheet media are conveyed. Sheet medium conveying devices that handle such sheet media are configured to control conveyance of a sheet media while detecting the marks with a sensor and identifying the position (or conveyance position) of the sheet medium on the basis of the positions of the marks. Hereinafter, the marks will be referred to as position detection marks.

As one of these sheet medium conveying devices, there has been proposed a sheet medium conveying device that has a mode in which the conveyance position of the sheet medium is identified on the basis of the positions of the position detection marks and a mode in which the conveyance position of the sheet medium is identified by conveying the sheet medium by a predetermined amount at a time, and when an error occurs during operating in one of the modes, continues its operation by operating in the other mode (see, e.g., Japanese Patent Application Publication No. 2008-238484).

SUMMARY OF THE INVENTION

An object of an aspect of the present invention is to provide a sheet medium conveying device, an image forming apparatus, and a sheet medium conveying method capable of accurately detecting a position detection mark.

According to an aspect of the present invention, there is provided a sheet medium conveying device that conveys a sheet medium in which position detection marks are provided at regular intervals in a medium conveying direction in which the sheet medium is conveyed, the sheet medium conveying device including a controller that controls conveyance of the sheet medium, wherein the controller selects one of a first standby position and a second standby position located downstream of the first standby position in the medium conveying direction, and conveys the sheet medium to the selected standby position and puts the sheet medium on standby.

DETAILED DESCRIPTION OF THE INVENTION

An embodiment of the present invention will be described below with reference to the drawings.

<1. External Configuration and Hardware Configuration of Image Forming Apparatus>

Figure 1:
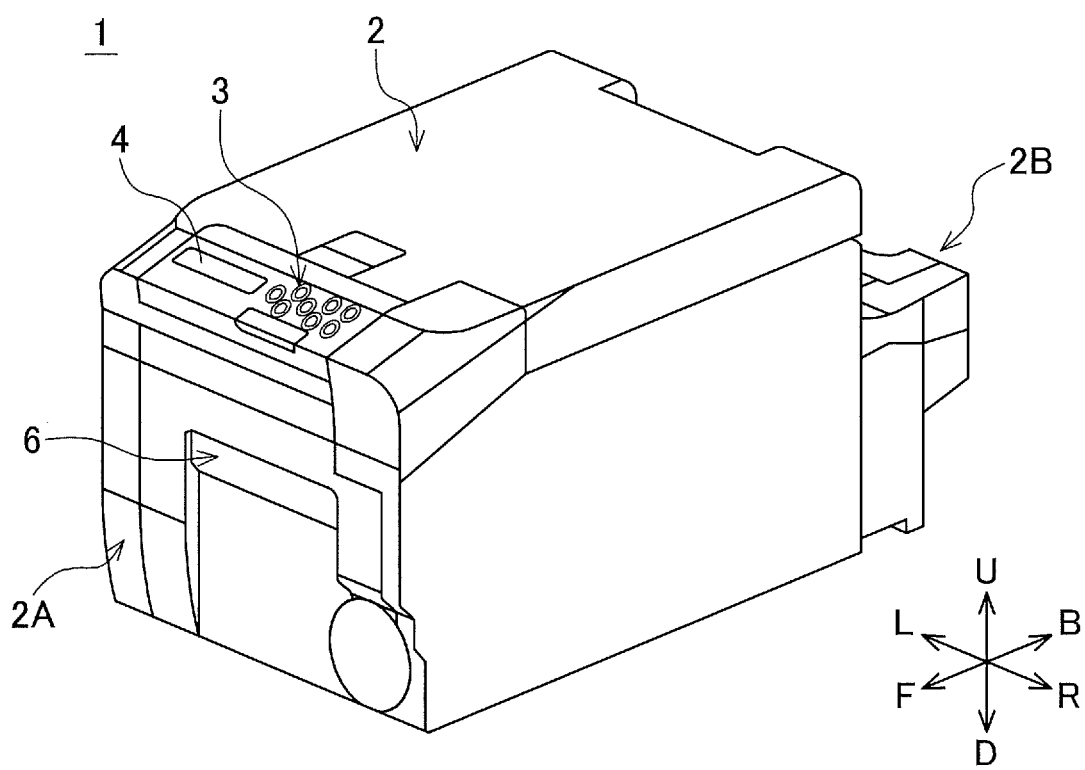
FIG. 1 is a perspective view illustrating an external configuration of an image forming apparatus of an embodiment.
Figure 2:
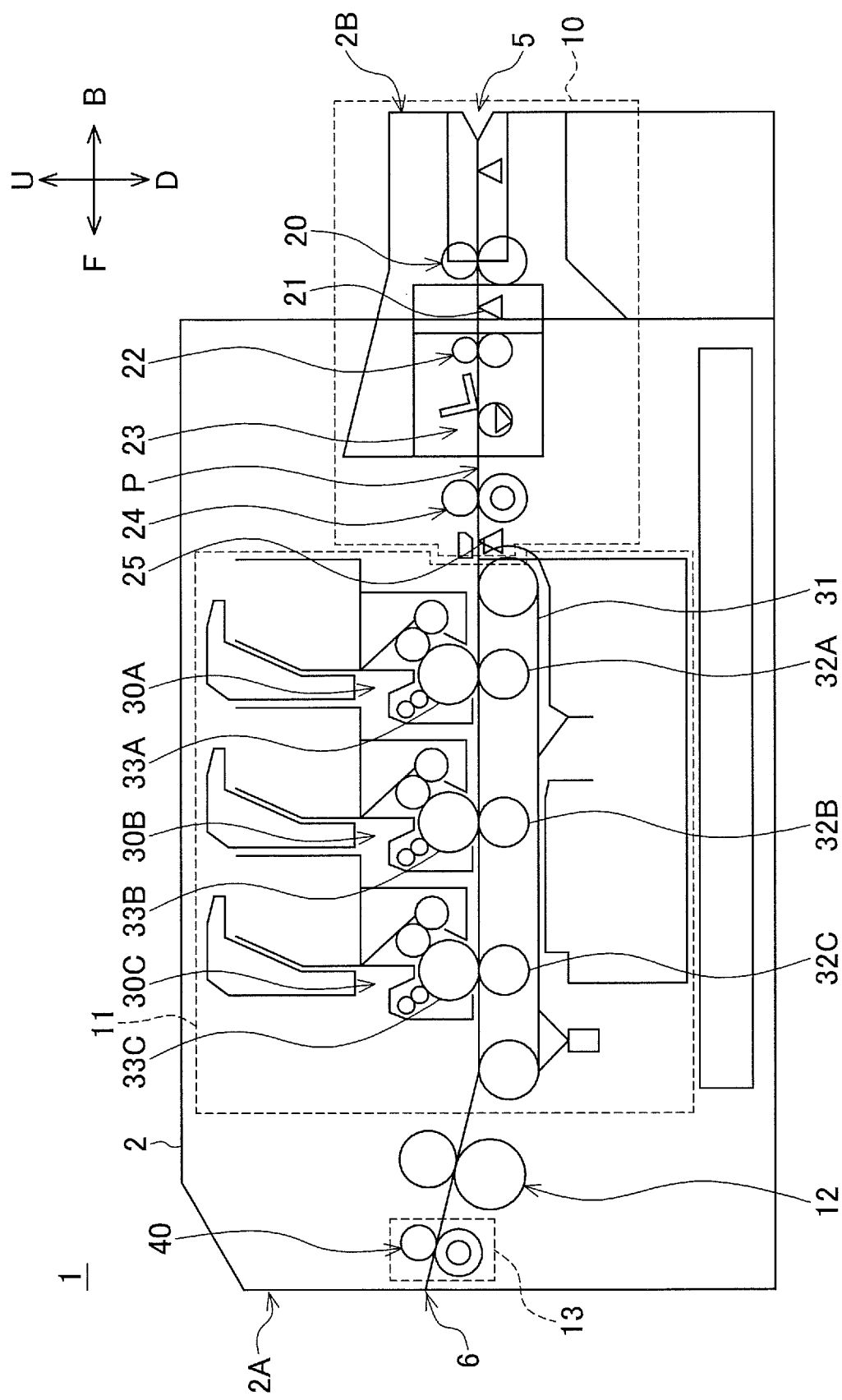
FIG. 2 is a side sectional view illustrating a hardware configuration of the image forming apparatus of the embodiment.

FIG. 1 illustrates an external configuration of an image forming apparatus 1 of an embodiment. FIG. 2 illustrates a hardware configuration in the image forming apparatus 1. FIG. 1 is an external perspective view of the image forming apparatus 1 as viewed from the front. FIG. 2 is a side sectional view of the image forming apparatus 1. As illustrated in FIGS. 1 and 2, the image forming apparatus 1 is an electrophotographic printer that forms (or prints) an image on a front side of a sheet medium SM illustrated in FIG. 3. The image forming apparatus 1 includes a substantially box-shaped housing 2. The sheet medium SM has a back side opposite the front side, on which an image is formed. Black marks BL are provided on the back side of the sheet medium SM at regular intervals in a medium conveying direction indicated by arrow Ar. The black marks BL are position detection marks for detecting a position (or conveyance position) of the sheet medium SM, and are used, for example, for identifying the positions of labels or perforations of the sheet medium SM, or for determining a time for image formation (or writing) onto the sheet medium SM.

Here, it is assumed that a direction (indicated by arrow B in the drawings) from a front surface 2A to a back surface 2B of the housing 2 is the backward direction, a direction (indicated by arrow F in the drawings) from the back surface 2B to the front surface 2A is the forward direction, a direction (indicated by arrow U in the drawings) from the lower side to the upper side of the housing 2 is the upward direction, a direction (indicated by arrow D in the drawings) from the upper side to the lower side of the housing 2 is the downward direction, a direction (indicated by arrow L in the drawings) from the right side to the left side of the housing 2 is the leftward direction, and a direction (indicated by arrow R in the drawings) from the left side to the right side of the housing 2 is the right ward direction.

An operating portion 3 and a display 4 are disposed on the front surface 2A side of an upper portion of the housing 2. The operating portion 3 is composed of, for example, buttons or the like, and receives operations by a user. The display 4 is composed of, for example, a liquid crystal panel or the like, and displays various information indicating the state of the image forming apparatus 1 or the like. The back surface 2B of the housing 2 is provided with a medium inlet 5 (see FIG. 2) through which the sheet medium SM is fed. The front surface 2A of the housing 2 is provided with a medium outlet 6 through which the sheet medium SM is discharged.

In the housing 2, a conveying path P serving as a path of the sheet medium SM is formed to extend in the front-back direction from the medium inlet 5 provided in the back surface 2B to the medium outlet 6 provided in the front surface 2A. Parts constituting an electrophotographic printer are arranged along the conveying path P. The sheet medium SM is conveyed with its front side, on which an image is formed, facing upward and its back side, on which the black marks BL are provided, facing downward.

Specifically, a medium feeder 10 is disposed in the vicinity of the medium inlet 5 on the upstream side of the conveying path P in the medium conveying direction. An image forming portion 11 is disposed downstream (or in front) of the medium feeder 10 in the medium conveying direction. A fixing unit 12 is disposed downstream of the image forming portion 11 in the medium conveying direction. A medium discharger 13 is disposed downstream of the fixing unit 12 in the medium conveying direction.

Figure 4:
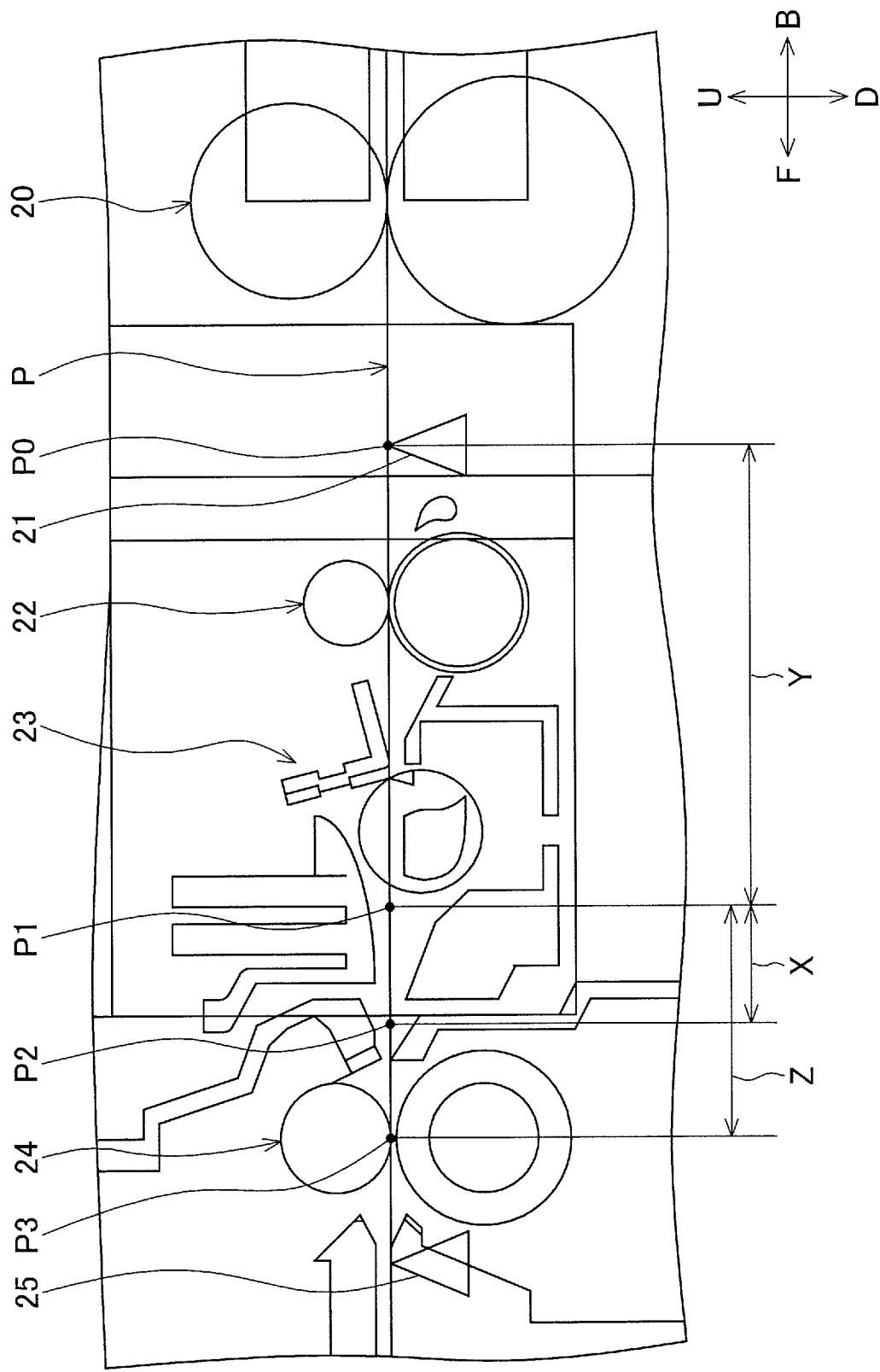
FIG. 4 is a side sectional view illustrating a configuration of a medium feeder of the embodiment.

The medium feeder 10 conveys the sheet medium SM fed through the medium inlet 5, to the image forming portion 11. As illustrated in FIG. 2 and FIG. 4, which is an enlarged view, the medium feeder 10 includes a first pair of conveying rollers 20, a black mark detection sensor 21, a second pair of conveying rollers 22, a cutter 23, a third pair of conveying rollers 24, and a leading edge detection sensor 25, which are disposed in this order from the upstream side in the medium conveying direction along the conveying path P.

Each of the first to third pairs of conveying rollers 20, 22, and 24 is composed of two conveying rollers disposed to face each other in the up-down direction with the conveying path P therebetween, and is configured to convey the sheet medium SM while nipping it between the conveying rollers. One of the two conveying rollers disposed to face each other in the up-down direction with the conveying path P therebetween is a driving roller, and the other is a driven roller, for example.

The black mark detection sensor 21 is a sensor that detects the black marks BL provided in the sheet medium SM. The black mark detection sensor 21 is a reflective photoelectric sensor. The black mark detection sensor 21 is disposed below the conveying path P (i.e., on a side of the conveying path P facing the back side of the sheet medium SM). The black mark detection sensor 21 emits light upward toward the back side of the sheet medium SM traveling along the conveying path P, and receives reflection light reflected by the sheet medium SM. As illustrated in FIG. 4, the black mark detection sensor 21 is configured so that when the sheet medium SM passes through a detection point P0 located above the black mark detection sensor 21, the black mark detection sensor 21 can detect, from variation in the amount of the received reflection light, an arrival of a leading edge (or front edge) of the sheet medium SM in the medium conveying direction at the detection point P0, arrivals of leading edges (or front edges) of the black marks BL in the medium conveying direction at the detection point P0, and arrivals of trailing edges (or rear edges) of the black marks BL in the medium conveying direction at the detection point P0. In the following description, the leading edge of the sheet medium SM in the medium conveying direction will be simply referred to as the leading edge of the sheet medium SM, the leading edges of the black marks BL in the medium conveying direction will be simply referred to as the leading edges of the black marks BL, and the trailing edges of the black marks BL in the medium conveying direction will be simply referred to as the trailing edges of the black marks BL.

The cutter 23 cuts the sheet medium SM in a transverse (or lateral) direction perpendicular to the medium conveying direction, for example. The leading edge detection sensor 25 is a sensor that detects the leading edge of the sheet medium SM. The leading edge detection sensor 25 is, for example, a contact sensor that detects the leading edge of the sheet medium SM by detecting contact with the leading edge of the sheet medium SM, or a reflective photoelectric sensor, like the black mark detection sensor 21.

In the medium feeder 10, a point P1 on the conveying path P located near the cutter 23 between the cutter 23 and the third pair of conveying rollers 24 is set as a first standby position P1 at which the sheet medium SM is put on standby. Further, in the medium feeder 10, a point P2 on the conveying path P located downstream of the first standby position P1 in the medium conveying direction is set as a second standby position P2. The point P2 is located upstream of the third pair of conveying rollers 24 in the medium conveying direction and near the third pair of conveying rollers 24. When the sheet medium SM is put on standby in the medium feeder 10, it is put on standby with the leading edge of the sheet medium SM located at the first standby position P1 or with the leading edge of the sheet medium SM located at the second standby position P2. A reason why the first standby position P1 and second standby position P2 are provided as standby positions of the sheet medium SM will be described later.

The image forming portion 11 (see FIG. 2), which is located downstream of the medium feeder 10 in the medium conveying direction, forms (or prints) an image on the sheet medium SM conveyed from the medium feeder 10. The image forming portion 11 includes multiple (e.g., three) image forming units 30A-30C (which may be referred to as image forming units 30), a transfer belt 31, and multiple (e.g., three) transfer rollers 32A-32C (which may be referred to as transfer rollers 32). The image forming units 30 are disposed above the conveying path P. The transfer belt 31 and transfer rollers 32 are disposed below the conveying path P.

The three image forming units 30A-30C are arranged along the conveying path P in the front-back direction, and correspond to respective toners of three colors used in the image forming apparatus 1. The three image forming units 30A-30C respectively include photosensitive drums 33A-33C (which may be referred to as photosensitive drums 33), and form toner images of the respective colors to be transferred onto the sheet medium SM, on the respective photosensitive drums 33A-33C.

The transfer belt 31 is an annular belt extending along the conveying path P in the front-back direction. The transfer belt 31 travels in the front-back direction and conveys the sheet medium SM along the conveying path P. The three transfer rollers 32A-32C are disposed inside the transfer belt 31 to respectively face the three photosensitive drums 33A-33C with the transfer belt 31 therebetween. When the sheet medium SM passes through between the transfer rollers 32A-32C and the photosensitive drums 33A-33C, the three transfer rollers 32A-32C transfer toner images of the respective colors formed on the photosensitive drums 33A-33C, onto the front side of the sheet medium SM.

The fixing unit 12, which is located downstream of the image forming portion 11 in the medium conveying direction, heats and presses the sheet medium SM with the toner images transferred thereon to fix the toner images onto the sheet medium SM. The medium discharger 13, which is located downstream of the fixing unit 12 in the medium conveying direction, discharges the sheet medium SM, which has passed through the fixing unit 12, out of the housing 2 through the medium outlet 6. The medium discharger 13 includes a fourth pair of conveying rollers 40 disposed near the medium outlet 6 on the conveying path P. Similarly to the first to third pairs of conveying rollers 20, 22 and 24, the fourth pair of conveying rollers 40 is composed of two conveying rollers disposed to face each other in the up-down direction with the conveying path P therebetween, and is configured to convey the sheet medium SM while nipping it between the conveying rollers.

<2. Functional Configuration of Image Forming Apparatus>

Figure 5:
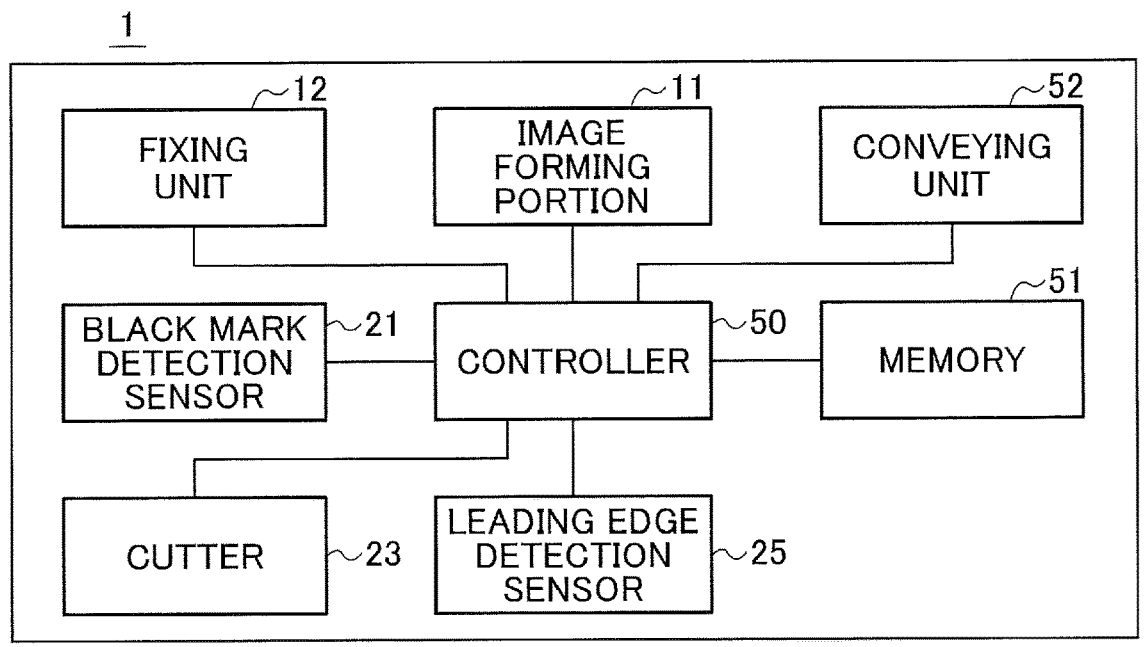
FIG. 5 is a block diagram illustrating a functional configuration of the image forming apparatus of the embodiment.

Next, a functional configuration of the image forming apparatus 1 will be described with reference to the block diagram illustrated in FIG. 5. The image forming apparatus 1 includes, as functional components, a controller 50, a memory (or storage unit) 51, a conveying unit (or conveyor) 52, the image forming portion 11, the fixing unit 12, the black mark detection sensor 21, the cutter 23, and the leading edge detection sensor 25.

The controller 50, which may be or include one or more processors, reads a program stored in the memory 51 and executes it, thereby controlling the conveying unit 52, image forming portion 11, fixing unit 12, and cutter 23. However, the controller 50 may be implemented by hardware circuitry. The controller 50 obtains the position of the leading edge of the sheet medium SM and the positions of the black marks BL from detection by the black mark detection sensor 21 and detection by the leading edge detection sensor 25. The controller 50 calculates, as the position of a black mark BL on the sheet medium SM, a midpoint or intermediate point between the position of the leading edge of the black mark BL (specifically, a distance from the leading edge of the sheet medium SM to the leading edge of the black mark BL) and the position of the trailing edge of the black mark BL (specifically, a distance from the leading edge of the sheet medium SM to the trailing edge of the black mark BL) that are detected by the black mark detection sensor 21.

The controller 50 controls the conveying unit 52 on the basis of the position of the sheet medium SM detected by the black mark detection sensor 21. The controller 50 controls the cutter 23 on the basis of the position of a black mark BL detected by the black mark detection sensor 21. The controller 50 controls the image forming portion 11 on the basis of the position of the sheet medium SM detected by the leading edge detection sensor 25.

The controller 50 determines a time for stopping the sheet medium SM, a time for cutting the sheet medium SM, and a time for printing onto the sheet medium SM, and the like, on the basis of the obtained positions of the leading edge of the sheet medium SM and the black marks BL. Specifically, for example, the controller 50 determines a time for stopping the sheet medium SM on the basis of the position of the leading edge of the sheet medium SM obtained from detection by the black mark detection sensor 21, determines a time for cutting the sheet medium SM on the basis of the position of a black mark BL obtained from detection by the black mark detection sensor 21, and determines a time for printing onto the sheet medium SM on the basis of the position of the leading edge of the sheet medium SM obtained from detection by the leading edge detection sensor 25.

The memory 51 stores the program, image data for printing, the position of the leading edge of the sheet medium SM, the positions of black marks BL, and the like. The conveying unit 52 includes a motor and an electromagnetic clutch (not illustrated), and controls drive of the first to fourth pairs of conveying rollers 20, 22, 24, and 40 and the transfer belt 31 by driving the motor and electromagnetic clutch. Specifically, for example, the conveying unit 52 controls conveyance of the sheet medium SM in the medium feeder 10 by turning on and off an electromagnetic clutch intervening between a shaft of a motor and rotation shafts of the respective driving rollers of the first to third pairs of conveying rollers 20, 22, and 24 of the medium feeder 10 to transmit the torque of the motor to the rotation shafts of the respective driving rollers and stop the transmission of the torque. The descriptions of the image forming portion 11, fixing unit 12, black mark detection sensor 21, cutter 23, and leading edge detection sensor 25 are omitted here.

<3. Printing Operation of Image Forming Apparatus>

Next, a printing operation of the image forming apparatus 1 will be briefly described. When a printing operation is started, the controller 50 of the image forming apparatus 1 conveys the sheet medium SM to the first standby position P1 or second standby position P2 in the medium feeder 10 and puts it on standby (or causes it to wait) at the first standby position P1 or second standby position P2. After that, for example, when preparation for printing in the image forming portion 11 is completed, the controller 50 restarts conveyance of the sheet medium SM, and cuts the sheet medium SM at a predetermined cutting position with the cutter 23. The controller 50 then conveys a part of the sheet medium SM located downstream of the cutting position in the medium conveying direction, to the image forming portion 11.

The image forming portion 11 forms (or prints) an image (or toner images) on the front side of the part of the sheet medium SM conveyed from the medium feeder 10, and conveys the part of the sheet medium SM to the fixing unit 12. The fixing unit 12 fixes the toner image transferred on the part of the sheet medium SM conveyed from the image forming portion 11, onto the part of the sheet medium SM, and conveys the part of the sheet medium SM to the medium discharger 13. The medium discharger 13 discharges the part of the sheet medium SM conveyed from the fixing unit 12, outside the housing 2 through the medium outlet 6. In this manner, the image forming apparatus 1 prints an image on the part of the sheet medium SM and discharges it.

<4. Reason Why First And Second Standby Positions Are Provided>

Figure 3:
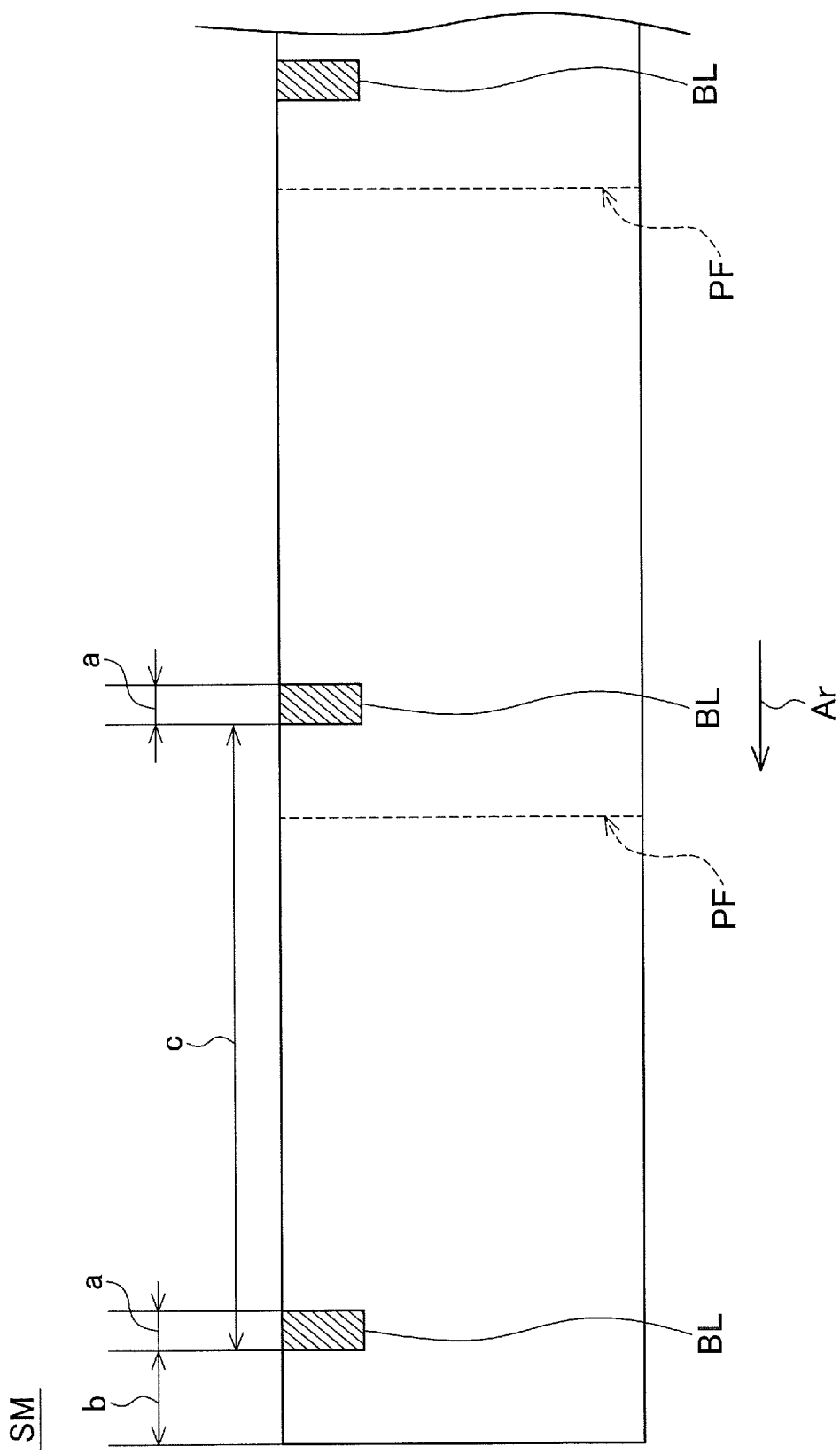
FIG. 3 is a view illustrating a configuration of a sheet medium of the embodiment.

Next, a reason why the first standby position P1 and second standby position P2 are provided in the medium feeder 10 will be described. To describe the reason, the sheet medium SM will be described first in detail. As illustrated in FIG. 3, the sheet medium SM extends like a strip, and the black marks BL are provided on the back side at regular intervals in a longitudinal direction of the sheet medium SM, in which the sheet medium SM is conveyed. Each black mark BL has a rectangular or quadrangular shape extending from one long side of the sheet medium SM in a transverse or lateral direction of the sheet medium SM, and is printed in black so that it can be distinguished from the other part of the back side. Also, perforations PF are provided in the sheet medium SM at regular intervals in the medium conveying direction. The positions of the perforations PF are displaced from the positions of the black marks BL in the medium conveying direction.

Here, a distance from the leading edge to the trailing edge of each black mark BL (i.e., a length of each black mark BL in the medium conveying direction) is denoted by a, a distance from the leading edge of the sheet medium SM to the leading edge of the black mark BL closest to the leading edge of the sheet medium SM is denoted by b, and a distance from the leading edge of a black mark BL to the leading edge of the next black mark BL (i.e., the interval between black marks BL adjacent to each other) is denoted by c.

Next, the relationship between dimensions of the sheet medium SM and the first standby position P1 and second standby position P2 will be described in detail. As illustrated in FIG. 4, a distance from the detection point P0 of the black mark detection sensor 21 to the first standby position P1 is denoted by Y, and a distance from the first standby position P1 to the second standby position P2 is denoted by X.

The distance Y from the detection point P0 to the first standby position P1 is set to be shorter than the distance c between adjacent black marks BL of the sheet medium SM. That is, Y<c. Thereby, in the medium feeder 10, the number of black marks BL passing through the detection point P0 before the leading edge of the sheet medium SM reaches the first standby position P1 is limited to at most one.

The distance X from the first standby position P1 to the second standby position P2 is set to be longer than the length a of the black marks BL in the medium conveying direction. That is, X>a. A reason why X>a will be described later. Further, it is desirable that the distance X be set to be shorter than a distance Z from the first standby position P1 to a point P3 at which the sheet medium SM is nipped by the third pair of conveying rollers 24. The medium nipping point P3 is located downstream of the first standby position P1 in the medium conveying direction. That is, it is desirable that X<Z. This is to prevent the sheet medium SM from being drawn by the third pair of conveying rollers 24 when the sheet medium SM is put on standby at the second standby position P2.

Next, a problem occurring when the first standby position P1 is the only standby position in the medium feeder 10 will be described. The distance b from the leading edge of the sheet medium SM to the leading edge of the black mark BL closest to the leading edge of the sheet medium SM varies among different sheet media SM and varies depending on where the sheet medium SM has been cut, for example.

Figure 6:
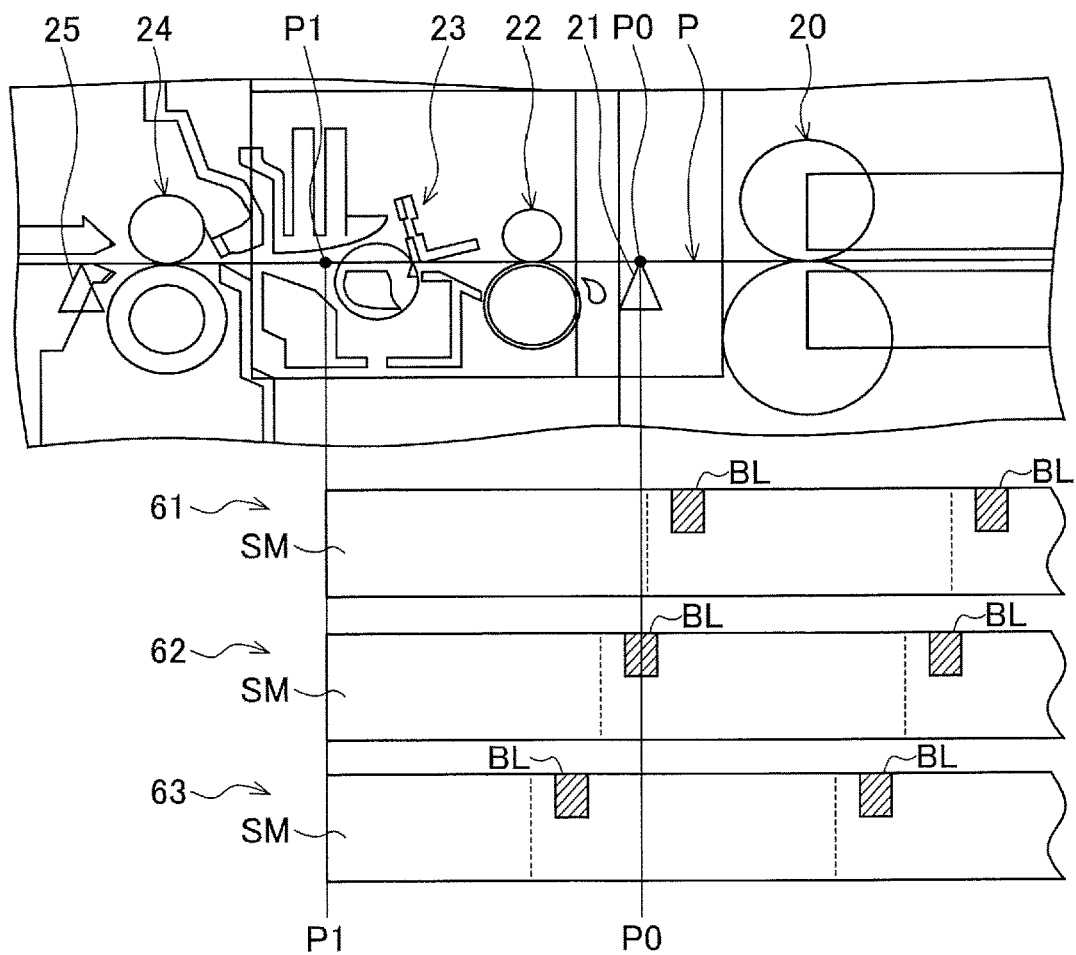
FIG. 6 is a view illustrating the positions of black marks when the medium feeder of the embodiment has only a first standby position as a standby position.

FIG. 6 illustrates the positional relationship between the position of the black mark BL closest to the leading edge of the sheet medium SM and the detection point P0 of the black mark detection sensor 21, when the sheet medium SM is put on standby at the first standby position P1. As illustrated in FIG. 6, the positional relationship between the position of the black mark BL closest to the leading edge of the sheet medium SM and the detection point P0 of the black mark detection sensor 21 can be generally classified into three patterns: a first pattern illustrated as pattern 61 in FIG. 6, a second pattern illustrated as pattern 62 in FIG. 6, and a third pattern illustrated as pattern 63 in FIG. 6. FIG. 6 consists of a side sectional view of the medium feeder 10, and views of the back side of the sheet medium SM corresponding to the first to third patterns.

The first pattern illustrated as pattern 61 is a pattern in which when the sheet medium SM is put on standby at the first standby position P1, the black mark BL is located upstream of the detection point P0 of the black mark detection sensor 21 in the medium conveying direction. In the first pattern, the black mark detection sensor 21 has not detected the black mark BL. In the case of the first pattern, the black mark detection sensor 21 will detect the black mark BL (specifically, detect the leading and trailing edges of the black mark BL) after conveyance of the sheet medium SM is restarted.

The second pattern illustrated as pattern 62 is a pattern in which when the sheet medium SM is put on standby at the first standby position P1, the detection point P0 of the black mark detection sensor 21 is located between the leading edge and trailing edge of the black mark BL. In the second pattern, the black mark detection sensor 21 has detected the leading edge of the black mark BL but has not detected the trailing edge of the black mark BL. In the case of the second pattern, the black mark detection sensor 21 will detect the trailing edge of the black mark BL after conveyance of the sheet medium SM is restarted.

The third pattern illustrated as pattern 63 is a pattern in which when the sheet medium SM is put on standby at the first standby position P1, the black mark BL is located downstream of the detection point P0 of the black mark detection sensor 21 in the medium conveying direction. In the third pattern, the black mark detection sensor 21 has already completed detection of the black mark BL.

By the way, in the medium feeder 10, a time lag occurs between when the controller 50 commands the conveying unit 52 to put the sheet medium SM on standby (i.e., stop conveyance of the sheet medium SM), and when the sheet medium SM is actually put on standby (i.e., stopped). This is because it takes time before transmission of the torque of the motor to the rotation shafts of the respective driving rollers of the first to third pairs of conveying rollers 20, 22, and 24 of the medium feeder 10 is stopped after an OFF signal is input to the electromagnetic clutch of the conveying unit 52. Also, a time lag occurs between when the controller 50 commands the conveying unit 52 to restart conveyance of the sheet medium SM, and when conveyance of the sheet medium SM is actually restarted. This is because it takes time before the torque of the motor is transmitted to the rotation shafts of the respective driving rollers of the first to third pairs of conveying rollers 20, 22, and 24 of the medium feeder 10 after an ON signal is input to the electromagnetic clutch of the conveying unit 52.

In the case of the second pattern, both the time lag in putting the sheet medium SM on standby and the time lag in restarting the conveyance occur between when the leading edge of the black mark BL is detected and when the trailing edge of the black mark BL is detected. This causes a difference between the detected position and actual position of the trailing edge of the black mark BL, and leads to a situation where a distance between the detected leading and trailing edges of the black mark BL is different from (e.g., longer than) the actual distance (i.e., the length a of the black mark BL). As a result, in the second pattern, an error occurs in the detected position of the black mark BL (specifically, the detected position of the midpoint of the leading edge and trailing edge of the black mark BL).

On the other hand, in the first and third patterns, although both the time lag in putting the sheet medium SM on standby and the time lag in restarting the conveyance occur, neither of the time lags occurs between when the leading edge of the black mark BL is detected and when the trailing edge of the black mark BL is detected. Thus, in the first and third patterns, a distance between the detected leading and trailing edges of the black mark BL is substantially equal to the actual distance (i.e., the length a of the black mark BL). Thus, in the first and third patterns, the position of the black mark BL can be detected more accurately than in the second pattern.

As above, if the first standby position P1 is the only standby position in the medium feeder 10, the detection point P0 of the black mark detection sensor 21 can be located between the leading and trailing edges of the black mark BL in the medium conveying direction when the sheet medium SM is put on standby at the first standby position P1. This results in inaccurate detection of the position of the black mark BL.

Thus, in this embodiment, to avoid the situation where the detection point P0 of the black mark detection sensor 21 is located between the leading and trailing edges of the black mark BL in the medium conveying direction when the sheet medium SM is put on standby, the first standby position P1 and second standby position P2 are provided in the medium feeder 10.

Figure 7:
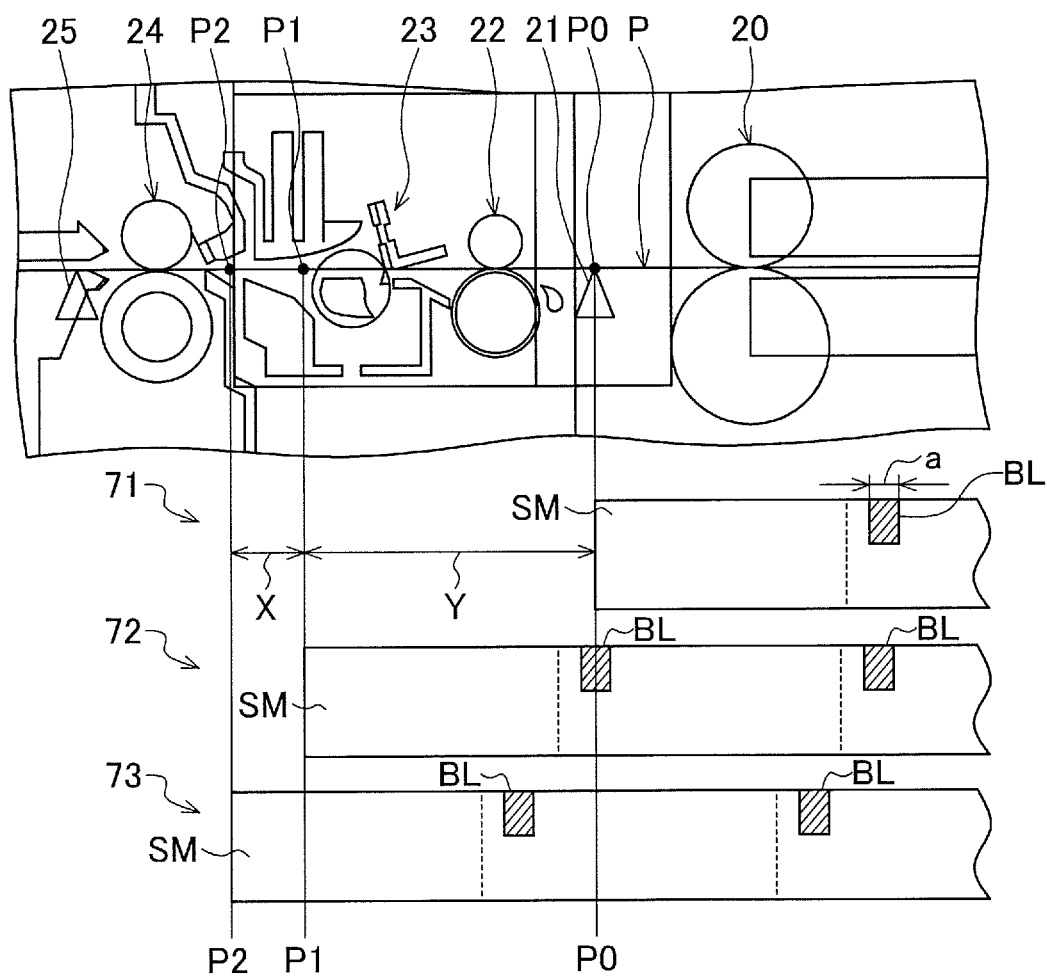
FIG. 7 is a view illustrating the positions of black marks when the medium feeder of the embodiment has the first standby position and a second standby position.

Specifically, in the medium feeder 10, the standby position is first set to the first standby position P1, and the sheet medium SM is conveyed to the first standby position P1 (see state 71 in FIG. 7). When the black mark detection sensor 21 detects the leading edge of the black mark BL before the leading edge of the sheet medium SM reaches the first standby position P1 (see state 72 in FIG. 7), the medium feeder 10 changes the standby position to the second standby position P2, and conveys the sheet medium SM to the second standby position P2 and puts it on standby (see state 73 in FIG. 7).

At this time, since the distance X from the first standby position P1 to the second standby position P2 is longer than the length a of the black mark BL, the black mark BL is located downstream of the detection point P0 in the medium conveying direction. Thus, in the medium feeder 10, while the leading edge of the sheet medium SM reaches the second standby position P2 from the first standby position P1, the black mark detection sensor 21 detects the trailing edge of the black mark BL.

With such an operation (referred to below as the medium standby operation), in the medium feeder 10 of this embodiment, it is possible to avoid the situation where the detection point P0 of the black mark detection sensor 21 is located between the leading and trailing edges of the black mark BL in the medium conveying direction when the sheet medium SM is put on standby. As a result, it is possible to detect the position of the black mark BL more accurately than when the first standby position P1 is the only standby position.

Making the distance X from the first standby position P1 to the second standby position P2 too long can lead to a situation where the next black mark BL reaches the detection point P0 when the sheet medium SM is conveyed to the second standby position P2, and increases the size of the medium feeder 10. Thus, it is desirable that the distance X be longer than the length a of the black mark BL and be as short as possible. For example, it is desirable that the distance (Y+X) from the detection point P0 to the second standby position P2 be shorter than the distance c between adjacent black marks BL.

<5. Medium Standby Operation of Medium Feeder>

Figure 8:
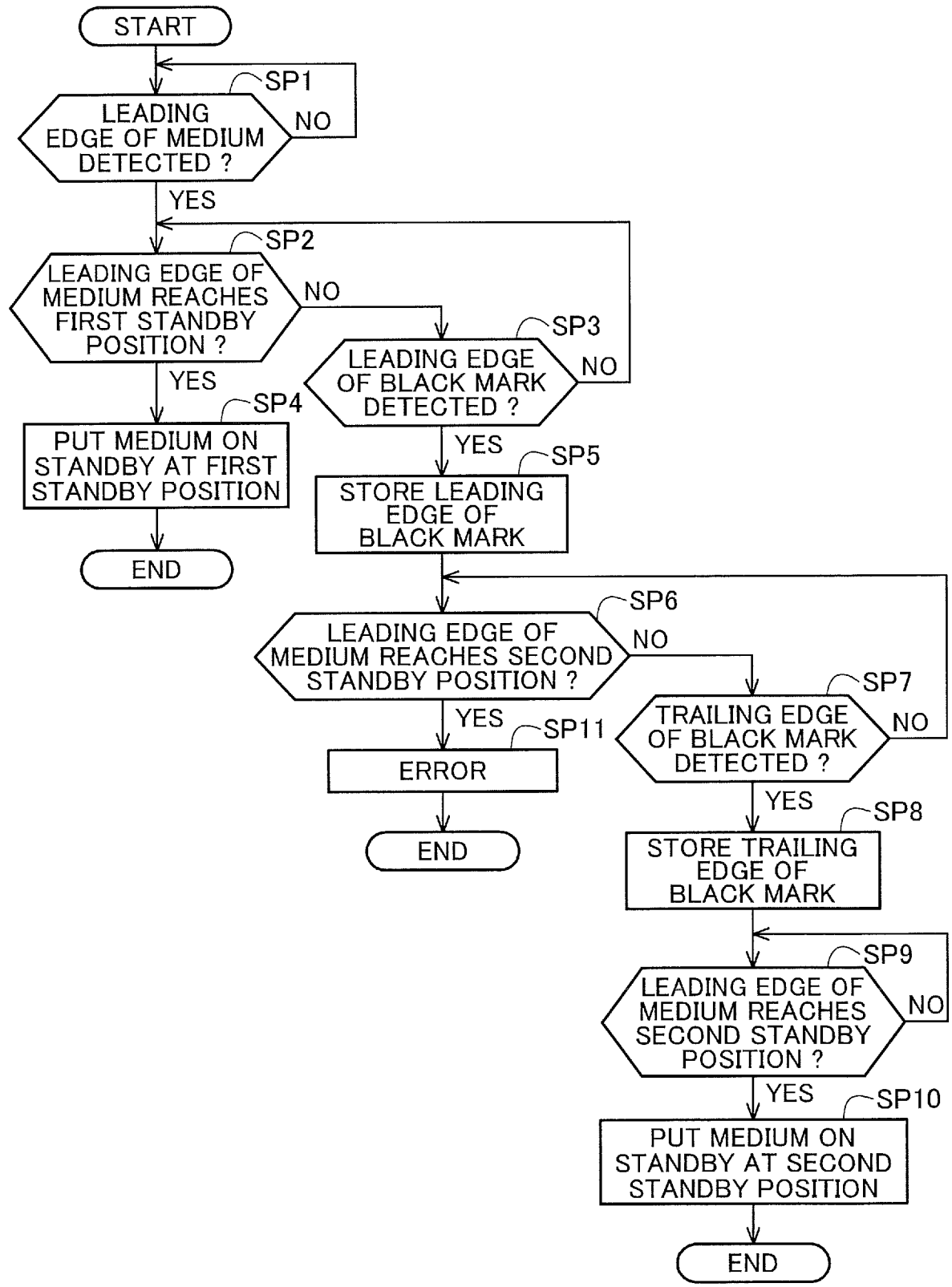
FIG. 8 is a flowchart illustrating a procedure of a medium standby operation of the embodiment.

Next, a procedure of the medium standby operation will be described in more detail with reference to the flowchart illustrated in FIG. 8. The medium standby operation is implemented by the controller 50 executing the program read from the memory 51.

When the controller 50 controls the conveying unit 52 to start conveyance of the sheet medium SM in the medium feeder 10, in the first step SP1, the controller 50 selects the first standby position P1 as the standby position in the medium feeder 10, and waits until the leading edge of the sheet medium SM is detected by the black mark detection sensor 21. When the leading edge of the sheet medium SM is detected by the black mark detection sensor 21, the controller 50 obtains a positive result in step SP1 and proceeds to step SP2.

In step SP2, the controller 50 estimates the position of the leading edge of the sheet medium SM on the basis of the speed of conveyance of the sheet medium SM and the time that has elapsed since the detection of the leading edge of the sheet medium SM, and determines whether the leading edge of the sheet medium SM has reached the first standby position P1 (i.e., the sheet medium SM has been conveyed by the distance Y).

When the leading edge of the sheet medium SM has not reached the first standby position P1, the controller 50 obtains a negative result in step SP2 and proceeds to step SP3. In step SP3, the controller 50 determines whether the leading edge of the black mark BL has been detected by the black mark detection sensor 21. When the leading edge of the black mark BL has not been detected, the controller 50 obtains a negative result in step SP3 and returns to step SP2.

When the leading edge of the black mark BL is not detected before the leading edge of the sheet medium SM reaches the first standby position P1, the controller 50 obtains a positive result in step SP2, proceeds to step SP4, and puts the sheet medium SM on standby at the first standby position P1, ending the medium standby operation.

On the other hand, when the leading edge of the black mark BL is detected before the leading edge of the sheet medium SM reaches the first standby position P1, the controller 50 obtains a positive result in step SP3, and proceeds to step SP5. In step SP5, the controller 50 stores, in the memory 51, the position of the leading edge of the black mark BL detected by the black mark detection sensor 21.

In the subsequent step SP6, the controller 50 selects the second standby position P2 as the standby position in the medium feeder 10, and determines whether the leading edge of the sheet medium SM has reached the second standby position P2 (i.e., the sheet medium SM has been conveyed by the distance Y+X).

When the leading edge of the sheet medium SM has not reached the second standby position P2, the controller 50 obtains a negative result in step SP6, and proceeds to step SP7. In step SP7, the controller 50 determines whether the trailing edge of the black mark BL has been detected by the black mark detection sensor 21. When the trailing edge of the black mark BL has not been detected, the controller 50 obtains a negative result in step SP7, and returns to step SP6.

When the trailing edge of the black mark BL is detected before the leading edge of the sheet medium SM reaches the second standby position P2, the controller 50 obtains a positive result in step SP7, and proceeds to step SP8. In step SP8, the controller 50 stores, in the memory 51, the position of the trailing edge of the black mark BL detected by the black mark detection sensor 21.

In the subsequent step SP9, the controller 50 waits until the leading edge of the sheet medium SM reaches the second standby position P2, and when the leading edge of the sheet medium SM reaches the second standby position P2, obtains a positive result in step SP9 and proceeds to step SP10. In step SP10, the controller 50 puts the sheet medium SM on standby at the second standby position P2, ending the medium standby operation.

When the sheet medium SM is normally conveyed, the trailing edge of the black mark BL definitely passes through the detection point P0 before the leading edge of the sheet medium SM reaches the second standby position P2, and thus no positive result is obtained in step SP6. However, for example, when the sheet medium SM is not normally conveyed due to a paper jam or the like, the trailing edge of the black mark BL may fail to pass through the detection point P0 before the leading edge of the sheet medium SM reaches the second standby position P2. In this case, the controller 50 obtains a positive result in step SP6, and proceeds to step SP11. In step SP11, the controller 50 performs error processing, such as indicating on the display 4 that an error has occurred, and ends the medium standby operation. The above has described a procedure of the medium standby operation.

<6. Comparative Example>

A sheet medium conveying device of a comparative example will be described. In the sheet medium conveying device of the comparative example, when a sheet medium is conveyed, a position detection mark passes through a detection point of a sensor. At this time, the sensor detects both edges of the position detection mark in the medium conveying direction, and thereby the position of the position detection mark is identified. In the comparative sheet medium conveying device, when conveyance of the sheet medium is stopped to put the sheet medium on standby, the detection point of the sensor can be located between one end (or a leading end) and the other end (or a trailing end) of the position detection mark in the medium conveying direction. In this case, for example, the position of the position detection mark is identified on the basis of the position of the leading edge of the position detection mark in the medium conveying direction detected before conveyance of the sheet medium is stopped, and the position of the trailing edge of the position detection mark in the medium conveying direction detected after the conveyance is restarted.

However, in the comparative sheet medium conveying device, due to a time lag occurring between when stopping conveyance of the sheet medium is commanded and when conveyance of the sheet medium is actually stopped, or a time lag occurring between when restarting the conveyance is commanded and when the conveyance is actually restarted, a difference occurs between the position of the trailing edge of the position detection mark in the medium conveying direction detected after conveyance of the sheet medium is restarted, and the actual position of the trailing edge. This results in an error in the detected position of the position detection mark.

As above, in the comparative sheet medium conveying device, the sheet medium can be stopped and put on standby with the detection point of the sensor located between both edges of the position detection mark in the medium conveying direction. This leads to inaccurate detection of the position of the position detection mark.

To address such a problem, it is conceivable, when the sheet medium has been stopped and put on standby with the detection point of the sensor located between both edges of the position detection mark in the medium conveying direction, to restart conveyance of the sheet medium after feeding the sheet medium backward, and then detect both edges of the position detection mark in the medium conveying direction. However, in this case, feeding the sheet medium backward delays conveyance of the sheet medium and decreases a throughput (e.g., the amount of the conveyance per unit time) of the sheet medium conveying device.

<7. Advantages>

As described above, in the image forming apparatus 1 according to the embodiment, the first standby position P1 and the second standby position P2 located downstream of the first standby position P1 in the medium conveying direction are provided as standby positions of the sheet medium SM on the conveying path P in the medium feeder 10. The controller 50, which controls conveyance of the sheet medium SM, is configured to select one of the first standby position P1 and second standby position P2, and convey the sheet medium SM to the selected standby position and put the sheet medium SM on standby.

Thus, it is possible to change the standby position of the sheet medium SM to avoid the situation where the detection point P0 of the black mark detection sensor 21 is located between one end (or the leading edge) and the other end (or the trailing edge) of a black mark BL in the medium conveying direction.

Thus, it is possible to provide a sheet medium conveying device, an image forming apparatus, and a sheet medium conveying method capable of accurately detecting a position detection mark without decreasing a throughput.

Specifically, the black mark detection sensor 21 detects the black marks BL when the black marks BL pass through the detection point P0, and the controller 50 determines whether to put the sheet medium SM on standby at the first standby position P1 or the second standby position P2, on the basis of a detection result obtained by the black mark detection sensor 21 before the sheet medium SM reaches the first standby position P1. More specifically, when the black mark detection sensor 21 detects no black marks BL before the sheet medium SM reaches the first standby position P1, the controller 50 puts the sheet medium SM on standby at the first standby position P1, and when the black mark detection sensor 21 detects at least one of the black marks BL before the sheet medium SM reaches the first standby position P1, the controller 50 conveys the sheet medium SM to the second standby position P2 and puts the sheet medium SM on standby.

More specifically, first, the controller 50 selects the first standby position P1 and conveys the sheet medium SM to the first standby position P1. When the black mark detection sensor 21 detects none of the leading edges of the black marks BL at the detection point P0 before the sheet medium SM reaches the first standby position P1, the controller 50 puts the sheet medium SM on standby at the first standby position P1. In this case, the leading edge and trailing edge of the black mark BL of the sheet medium SM are detected by the black mark detection sensor 21 after the conveyance is restarted.

On the other hand, when the black mark detection sensor 21 detects the leading edge of a black mark BL at the detection point P0 before the sheet medium SM reaches the first standby position P1, the controller 50 selects the second standby position P2, and conveys the sheet medium SM to the second standby position P2 and puts the sheet medium SM on standby.

At this time, since the distance X from the first standby position P1 to the second standby position P2 is longer than the length a of the black marks BL, the black mark BL is located downstream of the detection point P0 in the medium conveying direction. Thus, the black mark detection sensor 21 detects the trailing edge of the black mark BL before the leading edge of the sheet medium SM reaches the second standby position P2 from the first standby position P1. In this case, the leading edge and trailing edge of the black mark BL of the sheet medium SM are detected by the black mark detection sensor 21 before the sheet medium SM is put on standby.

Thereby, in the image forming apparatus 1, it is possible to avoid the situation where the detection point P0 of the black mark detection sensor 21 is located between the leading edge and trailing edge of the black mark BL when the sheet medium SM is put on standby in the medium feeder 10. Thus, the image forming apparatus 1 can accurately detect the black mark BL without feeding the sheet medium SM backward. Thereby, it is possible to accurately detect the black mark BL without decreasing a throughput (specifically, the number of prints produced per unit time or the amount of the conveyance per unit time) of the image forming apparatus 1 or medium feeder 10.

Further, the image forming apparatus 1 performs an operation of putting the sheet medium SM on standby at the first standby position P1 or second standby position P2, thereby continuously detecting the leading edge and trailing edge of the black mark BL without intervention of the standby process. Thus, it is possible to accurately detect a black mark BL with a simple configuration, without providing an additional sensor.

<8. Modifications>

<8-1. First Modification>

Figure 9:
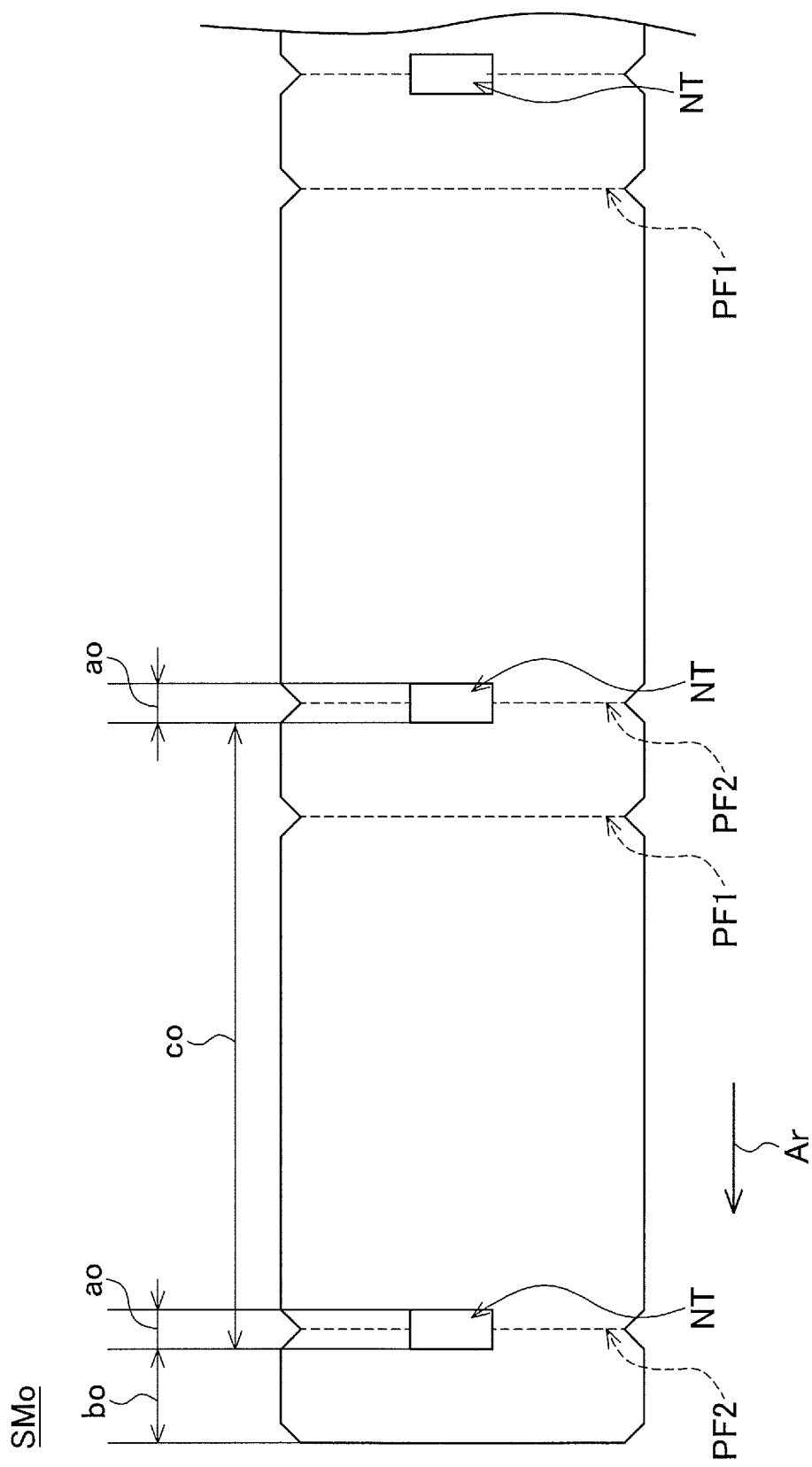
FIG. 9 is a view illustrating a configuration of a sheet medium of a modification.

In the above embodiment, the image forming apparatus 1 detects the black marks BL from the sheet medium SM in which the black marks BL as position detection marks are printed at regular intervals in the medium conveying direction. However, this is not mandatory. For example, from a sheet medium SMo in which notches (or holes) NT passing through the sheet medium SMo in a thickness direction thereof are provided as position detection marks at regular intervals in the medium conveying direction as illustrated in FIG. 9, the image forming apparatus 1 may detect the notches NT with the black mark detection sensor 21.

Specifically, in the sheet medium SMo, the notches NT, which are rectangular or quadrangular, are formed at a center portion in a transverse direction of the sheet medium SMo. Also, in the sheet medium SMo, first perforations PF1 are provided at regular intervals in the medium conveying direction. The positions of the first perforations PF1 are displaced from the positions of the notches NT in the medium conveying direction. Further, in the sheet medium SMo, second perforations PF2 are provided between the notches NT and both long sides of the sheet medium SMo.

Here, a distance from a leading edge to a trailing edge of each notch NT in the medium conveying direction (i.e., a length of each notch NT in the medium conveying direction) is denoted by ao, a distance from the leading edge of the sheet medium SMo to the leading edge of the notch NT closest to the leading edge of the sheet medium SMo is denoted by bo, and a distance from the leading edge of a notch NT to the leading edge of the next notch NT (i.e., a distance between notches NT adjacent to each other) is denoted by co.

In this case, the distance Y from the detection point P0 to the first standby position P1 is set to be shorter than the distance co between adjacent notches NT of the sheet medium SMo. That is, Y<co. Thereby, in the medium feeder 10, the number of notches NT passing through the detection point P0 before the leading edge of the sheet medium SMo reaches the first standby position P1 is limited to at most one. Also, the distance X from the first standby position P1 to the second standby position P2 is set to be longer than the length ao of the notches NT. That is, X>ao. Thereby, when the sheet medium SMo is conveyed to the second standby position P2, the notch NT is located downstream of the detection point P0 in the medium conveying direction.

Thereby, the image forming apparatus 1 can accurately detect the notch NT from the sheet medium SMo as in the case of detecting the black mark BL from the sheet medium SM.

In the above embodiment, as position detection marks provided at regular intervals in the medium conveying direction, the black marks BL that are rectangular and printed in black to extend from one long side of the sheet medium SM in the transverse direction of the sheet medium SM are provided in the sheet medium SM. However, the sheet medium SM may be provided with marks that function as position detection marks and differ from the black marks BL in position in the transverse direction of the sheet medium SM, size, shape, color, or the like. Also, in the sheet medium SMo, as position detection marks provided at regular intervals in the medium conveying direction, the rectangular notches NT are provided at the center portion in the transverse direction of the sheet medium SMo. However, the sheet medium SMo may be provided with notches (or holes) that function as position detection marks and differ from the notches NT in position in the transverse direction of the sheet medium SMo, size, shape, or the like. Further, the perforations PF are provided in the sheet medium SM, and the perforations PF1 and PF2 are provided in the sheet medium SMo. However, the perforations PF, PF1, and PF2 may be omitted. The image forming apparatus 1 may use sheet media provided with position detection marks detectable by the black mark detection sensor 21, other than the sheet media SM and SMo.

<8-2. Second Modification>

In the above embodiment, by setting the distance Y from the detection point P0 to the first standby position P1 to be shorter than the distance c between adjacent black marks BL in the medium conveying direction, the number of black marks BL passing through the detection point P0 before the leading edge of the sheet medium SM reaches the first standby position P1 is limited to at most one. However, this is not mandatory. The condition of Y<c may be eliminated, and the number of black marks BL passing through the detection point P0 before the leading edge of the sheet medium SM reaches the first standby position P1 may be two or more.

In this case, for example, when the leading edge of a black mark BL is detected but the trailing edge of the black mark BL is not detected while the leading edge of the sheet medium SM moves from a position located the distance c upstream of the first standby position P1 in the medium conveying direction to the first standby position P1, the controller 50 conveys the sheet medium SM to the second standby position P2 and puts it on standby; otherwise, the controller 50 conveys the sheet medium SM to the first standby position P1 and puts it on standby. Thereby, it is possible to avoid the situation where the detection point P0 of the black mark detection sensor 21 is located between the leading edge and trailing edge of a black mark BL.

<8-3. Third Modification>

In the above embodiment, when the black mark detection sensor 21 detects the leading edge of the black mark BL at the detection point P0 before the sheet medium SM reaches the first standby position P1, the sheet medium SM is conveyed to the second standby position P2 and put on standby. However, this is not mandatory. For example, when the black mark detection sensor 21 detects the leading edge of the black mark BL at the detection point P0 before the sheet medium SM reaches the first standby position P1, it is possible, after the black mark detection sensor 21 detects the trailing edge of the black mark BL at the detection point P0, to convey the sheet medium SM by a predetermined amount or distance that is sufficiently shorter than the distance c between adjacent black marks BL, and then stop the sheet medium SM to put it on standby. In this case, the second standby position P2 is the position of the leading edge of the sheet medium SM that has been conveyed by the predetermined amount since the detection of the trailing edge of the black mark BL at the detection point P0 by the black mark detection sensor 21. In this case, the second standby position P2 is variable, and for example, even when the length a of the black marks BL varies among different sheet media SM, it is possible to avoid the situation where the detection point P0 of the black mark detection sensor 21 is located between the leading edge and trailing edge of the sheet medium SM.

<8-4. Fourth Modification>

In the above embodiment, a reflective photoelectric sensor is used as the black mark detection sensor 21, which is a specific example of a detector for detecting the position detection marks. However, this is not mandatory, and it is possible to use other sensors, such as a transmissive photoelectric sensor, that can detect position detection marks, such as black marks BL or notches NT. In the case of a transmissive photoelectric sensor, a light emitter and a light receiver are disposed to face each other with the conveying path P therebetween. On the other hand, in the case of a reflective photoelectric sensor, a light emitter and a light receiver are integrally disposed on one side of the conveying path P. Thus, a reflective photoelectric sensor can be positioned with higher accuracy and detect the black marks BL with higher accuracy than a transmissive photoelectric sensor. Thus, it is preferable to use a reflective photoelectric sensor as the black mark detection sensor 21.

<8-5. Fifth Modification>

In the above embodiment, the present invention is applied to the medium feeder 10, which is a specific example of a sheet medium conveying device, and the image forming apparatus 1 including the medium feeder 10. However, this is not mandatory, and for example, the present invention is applicable to other image forming apparatuses including an image forming portion differing from that of the image forming apparatus 1. For example, the present invention is applicable to an image forming apparatus including an image forming portion of an intermediate transfer type in which toner images formed by image forming units are transferred onto an intermediate transfer belt and then transferred onto the sheet medium SM therefrom. Also, the present invention is applicable to a monochrome image forming apparatus including an image forming portion having a single image forming unit, and an image forming apparatus including a color image forming portion having four or more image forming units.

Further, in the above embodiment, the present invention is applied to the image forming apparatus 1, which is an electrophotographic printer, including the medium feeder 10 as a sheet medium conveying device. However, this is not mandatory, and the present invention is applicable to other image forming apparatuses, such as facsimile machines or copiers, including a sheet medium conveying device. Further, although in the above embodiment, the medium feeder 10 is provided in the image forming apparatus 1, the medium feeder 10 may be a unit detachably attachable to the image forming apparatus 1. As such, the present invention is applicable to a sheet medium conveying device to be attached to an image forming apparatus to convey a sheet medium to the image forming apparatus. Further, the above embodiment uses, as specific examples of a sheet medium, the sheet medium SM, which is a cut sheet, with the perforations PF, and the sheet medium SMo, which is a cut sheet, with the first perforations PF1 and second perforations PF2. However, this is not mandatory, and it is also possible to use other sheet media, such as a paper roll or fanfold paper, provided with position detection marks.

<8-6. Sixth Modification>

In the above embodiment, the medium feeder 10, which is a specific example of a sheet medium conveying device, is provided with the black mark detection sensor 21, which is a specific example of a detector that detects the position detection marks, and the cutter 23, which is a specific example of a cutting unit that cuts a sheet medium. However, this is not mandatory, and the medium feeder 10 may be provided with a detector differing from the black mark detection sensor 21 and a cutting unit differing from the cutter 23.

<8-7. Seventh Modification>

The present invention is not limited to any of the above embodiment and modifications. The present invention also covers all possible combinations or subsets of features of the above embodiment and modifications. The present invention can be practiced in various other aspects without departing from the inventive scope.

The present invention can be widely applied to image forming apparatuses, such as printers, facsimile machines, or multi-function peripherals, that handle sheet media.

The present disclosure includes the following aspects:

1. A sheet medium conveying device comprising:
   a conveyor that conveys a sheet medium in a medium conveying direction, the sheet medium having a position detection mark having a leading edge and a trailing edge in the medium conveying direction; and
   a detector that detects the leading edge and the trailing edge of the position detection mark at a detection point,
   wherein the conveyor is configured to
   when the detector does not detect the leading edge before the sheet medium reaches a first standby position located downstream of the detection point in the medium conveying direction, put the sheet medium on standby at the first standby position, and
   when the detector detects the leading edge before the sheet medium reaches the first standby position, convey the sheet medium at least until the trailing edge passes through the detection point, and put the sheet medium on standby.

2. The sheet medium conveying device of aspect 1, wherein the conveyor is configured to, when the detector detects the leading edge before the sheet medium reaches the first standby position, convey the sheet medium to a second standby position located downstream of the first standby position in the medium conveying direction and put the sheet medium on standby, a distance from the first standby position to the second standby position being longer than a distance from the leading edge to the trailing edge.

3. The sheet medium conveying device of aspect 1, wherein the conveyor is configured to
   when the detector detects the leading edge but does not detect the trailing edge before the sheet medium reaches the first standby position, convey the sheet medium to a second standby position and put the sheet medium on standby, a distance from the first standby position to the second standby position being longer than a distance from the leading edge to the trailing edge, and
   when the detector detects both the leading edge and the trailing edge before the sheet medium reaches the first standby position, put the sheet medium on standby at the first standby position.

4. The sheet medium conveying device of aspect 1, wherein the conveyor is configured to, when the detector detects the leading edge before the sheet medium reaches the first standby position, convey the sheet medium by a predetermined distance after the detector detects the trailing edge, and put the sheet medium on standby.

5. The sheet medium conveying device of any one of aspects 1 to 4, further comprising a determiner that determines a position of the position detection mark on a basis of detection of the leading edge and the trailing edge by the detector.

6. The sheet medium conveying device of aspect 5, further comprising a cutting unit that is disposed downstream of the detection point of the detector in the medium conveying direction, and cuts the sheet medium on a basis of the position of the position detection mark determined by the determiner.
7. The sheet medium conveying device of any one of aspects 1 to 6, wherein the detector is a reflective photoelectric sensor.
8. The sheet medium conveying device of aspect 2 or 3, wherein
the sheet medium has a plurality of position detection marks including the position detection mark, the plurality of position detection marks being spaced at regular intervals in the medium conveying direction; and
a distance from the detection point to the second standby position is shorter than the intervals between the plurality of position detection marks.
9. The sheet medium conveying device of any one of aspects 1 to 8, wherein the sheet medium has a plurality of position detection marks including the position detection mark, the plurality of position detection marks being spaced at regular intervals in the medium conveying direction.
10. An image forming apparatus comprising:
the sheet medium conveying device of any one of aspects 1 to 9; and
an image forming portion that forms an image on the sheet medium.
11. The image forming apparatus of aspect 10, wherein the image forming portion is disposed downstream of the sheet medium conveying device in the medium conveying direction and forms the image on the sheet medium conveyed by the sheet medium conveying device.
12. A sheet medium conveying method comprising:
conveying a sheet medium in a medium conveying direction, the sheet medium having a position detection mark having a leading edge and a trailing edge in the medium conveying direction;
detecting the leading edge and the trailing edge of the position detection mark at a detection point;
when the leading edge is not detected before the sheet medium reaches a first standby position located downstream of the detection point in the medium conveying direction, putting the sheet medium on standby at the first standby position; and
when the leading edge is detected before the sheet medium reaches the first standby position, conveying the sheet medium at least until the trailing edge passes through the detection point, and putting the sheet medium on standby.

What is claimed is:

1. A sheet medium conveying device that conveys, in a medium conveying direction, a sheet medium having a position detection mark, the sheet medium conveying device comprising:
a detector that detects the position detection mark of the sheet medium; and
a controller that controls conveyance of the sheet medium,
wherein the controller selects one of a first standby position and a second standby position located downstream of the first standby position in the medium conveying direction on a basis of a detection result obtained by the detector, and conveys the sheet medium to the selected standby position and puts the sheet medium on standby.

2. The sheet medium conveying device of claim 1, wherein a distance from the first standby position to the second standby position is longer than a length of the position detection mark in the medium conveying direction.
3. The sheet medium conveying device of claim 1, wherein the detector is a reflective photoelectric sensor.
4. The sheet medium conveying device of claim 1, wherein
the detector detects the position detection mark when the position detection mark passes through a detection point located upstream of the first standby position in the medium conveying direction.
5. The sheet medium conveying device of claim 4, wherein
when the detector does not detect the position detection mark before the sheet medium reaches the first standby position, the controller puts the sheet medium on standby at the first standby position, and
when the detector detects the position detection mark before the sheet medium reaches the first standby position, the controller conveys the sheet medium to the second standby position and puts the sheet medium on standby.
6. The sheet medium conveying device of claim 4, wherein the position detection mark is one of a plurality of position detection marks provided in the sheet medium at regular intervals in the medium conveying direction, and a distance from the detection point to the first standby position is shorter than the intervals in the medium conveying direction between the position detection marks provided in the sheet medium.
7. The sheet medium conveying device of claim 4, further comprising a cutting unit that is disposed downstream of the detection point of the detector in the medium conveying direction, and cuts the sheet medium,
wherein the controller controls the cutting unit on a basis of a position of the position detection mark detected by the detector.
8. An image forming apparatus comprising:
the sheet medium conveying device of claim 1; and
an image forming portion that forms an image on the sheet medium.
9. The image forming apparatus of claim 8, wherein the image forming portion is disposed downstream of the sheet medium conveying device in the medium conveying direction and forms the image on the sheet medium conveyed by the sheet medium conveying device.
10. The sheet medium conveying device of claim 1, further comprising a determiner that determines a position of the position detection mark on a basis of detection of the leading edge and the trailing edge by the detector.
11. The sheet medium conveying device of claim 10, further comprising a cutting unit that is disposed downstream of the detection point of the detector in the medium conveying direction, and cuts the sheet medium on a basis of the position of the position detection mark determined by the determiner.
12. A sheet medium conveying method comprising:
detecting a position detection mark of a sheet medium conveyed in a medium conveying direction;
selecting, by a controller that controls conveyance of the sheet medium, one of a first standby position and a second standby position located downstream of the first standby position in the medium conveying direction on a basis of a detection result obtained by the detector; and conveying, by the controller, the sheet medium to the selected standby position to put the sheet medium on standby.

13. The sheet medium conveying device of claim 1, wherein the controller obtains a position of the position detection mark from the detection by the detector.

14. The sheet medium conveying device of claim 1, wherein the controller controls conveyance of the sheet medium on a basis of detection by the detector.

15. A sheet medium conveying device comprising:
a conveyor that conveys a sheet medium in a medium conveying direction, the sheet medium having a position detection mark having a leading edge and a trailing edge in the medium conveying direction; and
a detector that detects the leading edge and the trailing edge of the position detection mark at a detection point,
wherein the conveyor is configured to
when the detector does not detect the leading edge before the sheet medium reaches a first standby position located downstream of the detection point in the medium conveying direction, put the sheet medium on standby at the first standby position, and
when the detector detects the leading edge before the sheet medium reaches the first standby position, convey the sheet medium at least until the trailing edge passes through the detection point, and put the sheet medium on standby.

16. The sheet medium conveying device of claim 15, wherein the conveyor is configured to, when the detector detects the leading edge before the sheet medium reaches the first standby position, convey the sheet medium to a second standby position located downstream of the first standby position in the medium conveying direction and put the sheet medium on standby, a distance from the first standby position to the second standby position being longer than a distance from the leading edge to the trailing edge.

17. The sheet medium conveying device of claim 16, wherein
the sheet medium has a plurality of position detection marks including the position detection mark, the plurality of position detection marks being spaced at regular intervals in the medium conveying direction; and
a distance from the detection point to the second standby position is shorter than the intervals between the plurality of position detection marks.

18. The sheet medium conveying device of claim 15, wherein the conveyor is configured to
when the detector detects the leading edge but does not detect the trailing edge before the sheet medium reaches the first standby position, convey the sheet medium to a second standby position and put the sheet medium on standby, a distance from the first standby position to the second standby position being longer than a distance from the leading edge to the trailing edge, and
when the detector detects both the leading edge and the trailing edge before the sheet medium reaches the first standby position, put the sheet medium on standby at the first standby position.

19. The sheet medium conveying device of claim 15, wherein the conveyor is configured to, when the detector detects the leading edge before the sheet medium reaches the first standby position, convey the sheet medium by a predetermined distance after the detector detects the trailing edge, and put the sheet medium on standby.

20. The sheet medium conveying device of claim 15, wherein the sheet medium has a plurality of position detection marks including the position detection mark, the plurality of position detection marks being spaced at regular intervals in the medium conveying direction.

* * * * *